(12) United States Patent
Sheshagiri et al.

(10) Patent No.: US 8,069,422 B2
(45) Date of Patent: Nov. 29, 2011

(54) CONTEXTUAL TASK RECOMMENDATION SYSTEM AND METHOD FOR DETERMINING USER'S CONTEXT AND SUGGESTING TASKS

(75) Inventors: Mithun Sheshagiri, Palo Alto, CA (US); Anugeetha Kunjithapatham, Sunnyvale, CA (US); Alan Messer, Los Gatos, CA (US)

(73) Assignee: Samsung Electronics, Co., Ltd., Suwon (KR)

( * ) Notice: Subject to any disclaimer, the term of this patent is extended or adjusted under 35 U.S.C. 154(b) by 961 days.

(21) Appl. No.: 11/200,546

(22) Filed: Aug. 9, 2005

(65) Prior Publication Data

US 2006/0156252 A1    Jul. 13, 2006

Related U.S. Application Data

(60) Provisional application No. 60/643,051, filed on Jan. 10, 2005.

(51) Int. Cl.
    *G06F 3/00*        (2006.01)
(52) U.S. Cl. .......................... 715/866; 715/744; 715/825
(58) Field of Classification Search .................. 715/866, 715/744, 825
    See application file for complete search history.

(56) References Cited

U.S. PATENT DOCUMENTS

| | | | |
|---|---|---|---|
| 5,530,861 A | | 6/1996 | Diamant et al. |
| 5,544,321 A | | 8/1996 | Theimer et al. ......... 395/200.11 |
| 5,555,376 A | * | 9/1996 | Theimer et al. .............. 709/229 |
| 5,611,050 A | * | 3/1997 | Theimer et al. ............... 709/202 |
| 5,812,865 A | * | 9/1998 | Theimer et al. ............... 709/228 |
| 5,910,799 A | * | 6/1999 | Carpenter et al. ............ 715/866 |
| 6,169,991 B1 | | 1/2001 | Tsukahara |
| 6,256,019 B1 | * | 7/2001 | Allport ........................ 345/169 |
| 6,389,288 B1 | * | 5/2002 | Kuwahara et al. .......... 455/456.6 |
| 6,563,430 B1 | * | 5/2003 | Kemink et al. .......... 340/825.49 |
| 6,792,323 B2 | | 9/2004 | Krzyzanowski et al. |

(Continued)

FOREIGN PATENT DOCUMENTS

EP    1168124    1/2002

(Continued)

OTHER PUBLICATIONS

Lashina et al., "The context aware personal remote control: a case study on context awareness", published 2003.*

(Continued)

*Primary Examiner* — Tuyetlien Tran
(74) *Attorney, Agent, or Firm* — Beyer Law Group LLP (57) ABSTRACT

A system and method in a network of devices, which ascertains the user's context to suggest the most preferred task for the user to perform. User's context includes his/her location, the content he/she is interested in, the devices which are being used by him/her, and the devices and content allowed to be used by the user. Using this context, the system suggests tasks to the user that are appropriate to that context. The determination of context and the suggestion of tasks are performed by keeping track of the content and the devices available to the user at any given time. The suggestion of tasks is performed in accordance with certain policies. For example, the user can control the behavior of the system by changing the rules in the policy. Tasks are in the form of simple sentences that can be easily understood by the user. If, based on certain context, more than one task is possible, the system suggests the task with the highest priority to the user.

18 Claims, 7 Drawing Sheets

U.S. PATENT DOCUMENTS

| | | | |
|---|---|---|---|
| 6,931,630 B1* | 8/2005 | Cotner et al. | 717/126 |
| 6,954,737 B2 | 10/2005 | Kalantar et al. | |
| 6,957,075 B1* | 10/2005 | Iverson | 455/456.3 |
| 7,024,256 B2 | 4/2006 | Krzyzanowski et al. | |
| 7,046,263 B1* | 5/2006 | Abbott et al. | 715/740 |
| 7,064,675 B2 | 6/2006 | Zigmond et al. | |
| 7,076,255 B2 | 7/2006 | Parupudi et al. | |
| 7,170,422 B2* | 1/2007 | Nelson et al. | 340/825.72 |
| 7,184,848 B2* | 2/2007 | Krzyzanowski et al. | 700/90 |
| 7,206,559 B2 | 4/2007 | Meade, II | |
| 7,307,746 B2 | 12/2007 | Inoue | |
| 7,336,942 B2 | 2/2008 | Wang | |
| 7,346,663 B2* | 3/2008 | Abbott et al. | 709/206 |
| 7,493,294 B2 | 2/2009 | Flinn et al. | |
| 7,522,549 B2 | 4/2009 | Karaoguz et al. | |
| 7,533,079 B2 | 5/2009 | Naito et al. | |
| 7,613,285 B2 | 11/2009 | Hay et al. | |
| 7,681,203 B2 | 3/2010 | Mandato et al. | |
| 7,707,267 B2 | 4/2010 | Lisitsa et al. | |
| 2001/0032132 A1* | 10/2001 | Moran | 705/14 |
| 2002/0119788 A1* | 8/2002 | Parupudi et al. | 455/456 |
| 2002/0138327 A1* | 9/2002 | Mello et al. | 705/9 |
| 2003/0046401 A1* | 3/2003 | Abbott et al. | 709/228 |
| 2003/0073412 A1* | 4/2003 | Meade, II | 455/70 |
| 2003/0088534 A1* | 5/2003 | Kalantar et al. | 706/50 |
| 2004/0068507 A1 | 4/2004 | Inoue | |
| 2004/0100505 A1 | 5/2004 | Cazier | |
| 2004/0163073 A1* | 8/2004 | Krzyzanowski et al. | 717/107 |
| 2004/0176118 A1 | 9/2004 | Strittmatter et al. | |
| 2004/0187152 A1 | 9/2004 | Francis et al. | |
| 2004/0230636 A1* | 11/2004 | Masuoka et al. | 708/800 |
| 2005/0035846 A1* | 2/2005 | Zigmond et al. | 340/5.22 |
| 2005/0055472 A1* | 3/2005 | Krzyzanowski et al. | 710/5 |
| 2005/0108354 A1* | 5/2005 | Lisitsa et al. | 709/212 |
| 2005/0114493 A1 | 5/2005 | Mandato et al. | |
| 2005/0164725 A1 | 7/2005 | Naito et al. | |
| 2005/0232242 A1* | 10/2005 | Karaoguz et al. | 370/352 |
| 2005/0246726 A1* | 11/2005 | Labrou et al. | 719/328 |
| 2005/0267770 A1* | 12/2005 | Banavar et al. | 705/1 |
| 2005/0283532 A1 | 12/2005 | Kim et al. | |
| 2005/0288035 A1* | 12/2005 | Wang | 455/456.1 |
| 2006/0064693 A1 | 3/2006 | Messer et al. | |
| 2006/0064694 A1 | 3/2006 | Messer et al. | |
| 2006/0069602 A1 | 3/2006 | Messer et al. | |
| 2006/0147001 A1 | 7/2006 | Ha et al. | |
| 2006/0149905 A1 | 7/2006 | Park et al. | |
| 2006/0156252 A1* | 7/2006 | Sheshagiri et al. | 715/825 |
| 2006/0156307 A1 | 7/2006 | Kunjithapatham et al. | |
| 2007/0233287 A1 | 10/2007 | Sheshagiri et al. | |
| 2007/0266384 A1 | 11/2007 | Labrou et al. | |

FOREIGN PATENT DOCUMENTS

| | | |
|---|---|---|
| EP | 1458140 A1 | 9/2004 |
| FR | 2 852 173 A1 | 9/2004 |
| JP | 2000-266551 | 9/2000 |
| JP | 2002-049556 | 2/2002 |
| JP | 2002-063033 | 2/2002 |
| JP | 2002-533802 | 10/2002 |
| JP | 2004-266453 | 9/2004 |
| KR | 2001-0041425 | 5/2001 |
| KR | 2002-0022049 | 3/2002 |
| KR | 1020050046580 | 5/2005 |
| KR | 1020060068518 | 6/2006 |
| WO | 00-38039 | 6/2000 |
| WO | 00/39964 A1 | 7/2000 |
| WO | WO 00/39964 | 7/2000 |
| WO | 01-69380 | 9/2001 |
| WO | WO 2004/081713 A2 | 9/2004 |

OTHER PUBLICATIONS

R. Kumar, V. Poladian, I. Greenberg, A. Messer, and D. Milojicic, *User-Centric Appliance Aggregation*, HP Labs: Tech Report: HPL-2002-227, Oct. 2, 2002.

European Search Report and Search Opinion; Application No. 06250036.8-1525; dated Sep. 17, 2007.

WC3 Semantic Web, Technology and Society Domain, "Semantic Web", http://www.w3.org/2001/sw/.

Tim Berners-Lee, James Hendler, Ora Lassila, "The Semantic Web: A new form of Web content that is meaningful to computers will unleash a revolution of new possibilities", Scientific American.com, May 17, 2001. http://www.sciam.com.

"DAML+OIL Specification", Mar. 2001, http://www.daml.org/2001/03/daml+oil.

Joseph B. Kopena, William C. Regli, "DAMLJessKB: A tool for reasoning with the Semantic Web". IEEE Intelligent Systems, 2003, pp. 74-77, vol. 18(3).

Dan Connolly, Frank Van Harmelen, Ian Horrocks, Deborah L. McGuinness, Peter F. Patel-Schneider, Lynn Andrea Stein, "DAML+OIL (Mar. 2001) Reference Description," W3C Note, Dec. 18, 2001. http://www.w3.org/tr/daml+oil+reference.

"OWL Web Ontology Language Reference", WC3 Semantic Web, Dec. 9, 2003, http://www.daml.org/2002/06/webont/owl-ref-proposed.html.

Volker Haarslev, Ralf Moller, "Description of the RACER System and its Applications", In Proceedings of the International Workshop in Description Logics 2001 (DL2001), Aug. 2001, Stanford, http://citeseer.ist.psu.edu/article/haarslev01description.html.

James Hendler, Tim Berners-Lee, Eric Miller "Integrating Applications on the Semantic Web," Journal of the Institute of Electrical Engineers of Japan, Oct. 2002, pp. 676-680, vol. 122(10).

Dejan Milojicic, Philippe Bernadat, Rick Corben, Ira Greenberg, Rajnish Kumar, Alan Messer, Dan Muntz, Eamonn O'Brien Strain, Vahe Poladian, Jim Rowson, "Appliance Aggregation Architecture (A3)", HP Labs Technical report HPL-2002-277, Jul. 3, 2003. pp. 1-10.

Dipanjan Chakraborty, Filip Perich, Sasikanth Avancha, Anupam Joshi, "DReggie: Semantic Service Discovery for M-Commerce Applications", Workshop on Reliable and Secure Applications in Mobile Environment, In Conjunction with 20th Symposium on Reliable Distributed Systems (SRDS), Oct. 12, 2001, http://ebiquity.umbc.edu/paper/html/id/49/.

Sasikanth Avancha, Anupam Joshi, Timothy Finin, "Enhanced Service Discovery in Bluetooth", IEEE Computer, Jun. 28, 2002. pp. 96-99, vol. 35, University of Maryland, Baltimore County.

Javier Gonzalez-Castillo, David Trastour, Claudio Bartolini: "Description Logics for Matchmaking of Services", Hewlett-Packard Company, 2001, pp. 1-13. Bristol, United Kingdom. http://www.hpl.hp.com/techreports/2001/HPL-2001-265.pdf.

Katia Sycara, Seth Widoff, Matthias Klusch, Jianguo Lu, "Larks: Dynamic Matchmaking among Heterogeneous Software Agents in Cyberspace", Autonomous Agents and Multi-Agent Systems, 2002, pp. 173-203, Kluwer Academic Publishers. http://www-2.cs.cmu.edu/~softagents/papers/LARKS.pdf.

Massimo Paolucci, Takahiro Kawamura, Terry R. Payne, Katia Sycara, "Semantic Matching of Web Services Capabilities", In First Int. Semantic Web. Conf. 2002, http://citeseer.ist.psu.edu/paolucci02semantic.html.

U.S. Office Action for U.S. Appl. No. 10/947,774 mailed Dec. 15, 2008.

U.S. Final Office Action for U.S. Appl. No. 10/947,774 mailed Aug. 31, 2009.

U.S. Office Action for U.S. Appl. No. 10/950,121 mailed Dec. 19, 2008.

U.S. Final Office Action for U.S. Appl. No. 10/950,121 mailed Sep. 2, 2009.

U.S. Office Action for U.S. Appl. No. 10/948,399 mailed Mar. 17, 2009.

U.S. Office Action for U.S. Appl. No. 11/394,968 mailed Aug. 25, 2008.

U.S. Final Office Action for U.S. Appl. No. 11/394,968 mailed Feb. 12, 2009.

U.S. Final Office Action for U.S. Appl. No. 10/948,399 mailed Oct. 27, 2009.

U.S. Non-final Office Action for U.S. Appl. No. 11/200,547 mailed May 5, 2010.

Chinese Third Office Action dated Aug. 4, 2010 issued for Chinese Patent Application No. 200510132458.3, filed Aug. 5, 2009, pp. 1-12, Beijing, China (English-language translation included).

Office Action (and English translation) in corresponding Korean Application No. 10. 2005-0112970, mailed Nov. 10, 2006.

Decision of Grant in in corresponding Korean Application No. 10-2005-0112970, mailed Jul. 16, 2007.

Huh et al., "A Policy-based Context Management Architecture for Ubiquitous Computing Environment," Nov. 3, 2004.

Office Action is corresponding Japanese Application No. 2006-001541, mailed Jan. 4, 2011.

Office Action for Korean Application 9-5-2006-069705515, dated Jan. 22, 2007.

Notice of Allowance in U.S. Appl. No. 10/950,121, mailed Apr. 20, 2011.

Notice of Allowance in U.S. Appl. No. 10/947,774, mailed Apr. 11, 2011.

Notice of Allowance in U.S. Appl. No. 10/948,399, mailed Jun. 3, 2011.

Office Action in corresponding Japanese Application No. 2005-274134, mailed Feb. 1, 2011.

* cited by examiner

CONTEXTUAL TASK RECOMMENDATION SYSTEM AND METHOD FOR DETERMINING USER'S CONTEXT AND SUGGESTING TASKS

RELATED APPLICATION

Priority is claimed from U.S. provisional patent application No. 60/643,051 filed Jan. 10 2005, which is incorporated herein by reference.

FIELD OF THE INVENTION

The present invention relates in general to providing user interfaces for user control of devices, and in particular to contextual task recommendation and a method for determining user's context and suggesting tasks.

BACKGROUND OF THE INVENTION

Typical user interfaces for user control of devices such as CE devices (e.g., TV, VCR, DVD player, CD player, etc.) are such that user tasks are not represented in the devices. Instead, a set of device functions are presented to the user and the user selects combinations of these device functions to perform a task. For example, to watch a video tape requires the user to select the input (e.g., tape), rewind the tape and press play on a VCR. As a result, the user cannot simply specify that he/she wishes to 'watch' 'video tape' to automate the above operations. Users cannot express desired tasks to be performed (e.g., 'watch' 'video tape'), rather users must directly control devices to perform desired functions (e.g., selecting the input, rewinding the tape and pressing play on a VCR).

This is similar to conventional software architecture wherein tasks map into the idea of an application. For example, if a user wants to write a letter, the user runs a word processor that has the appropriate functionality. However, apart from a well known functionality mapping to a well-known name, this expresses little to the user. Another alternative has been to present the user with a set of options in the form of a menu. Several systems allow well-known tasks to be listed in menu options (e.g., spell-check document or instant record on a VCR). However, such systems only provide device functions to the user.

Yet another alternative has been to allow a user to express the task graphically (e.g., using lines to connect together a set of depicted devices to perform a desired task). The problem with this approach is that it does not mask the complexity of using the devices from the user. It simply graphically represents the function selections to the user and asks the user to specify the connections necessary to perform a task.

Yet another alternative has been a system that discovers devices, and thereby the services available in an ad-hoc environment. The system identifies the services that could be aggregated and finally suggests the possible service combinations to the user. While suggesting the aggregated service combinations to the user, the system scores the services based on any user preferences set and execution history for the user and displays the service with the highest score to the user. However, in such a system the services are ranked based on user preferences and execution history without considering the context of the user, which results in scoring the services in a way that does not reflect the user intentions at that particular instant.

BRIEF SUMMARY OF THE INVENTION

The present invention addresses the above shortcomings. In one embodiment the present invention provides a system and method in a network of devices, which ascertains the user's context to suggest the most preferred task for the user to perform. User's context includes his/her location, the content he/she is interested in, the content he/she is allowed to access, the devices which are being used by him/her, and devices he/she is allowed to access. Using this context, the system suggests tasks to the user that are appropriate to that context.

The determination of context and the suggestion of tasks are performed by keeping track of the content and the devices available to the user at any given time. The suggestion of tasks is performed in accordance with certain policies. Further, the user can control the behavior of the system by changing the rules in the policy.

Tasks are in the form of simple sentences that can be easily understood by the user. If, based on certain context, more than one task is possible, the system suggests the task that is most relevant to the user, which is identified through a priority assigned to the task by a Prioritization module.

The system builds the context by correlating time, device information, content information, location information and actions performed by the user. This contextual information is then used to find and suggest tasks to the user resulting in task suggestions that are relevant to the user. Prior art only performs simple scoring based on device/task attributes and does not suggest tasks based on location.

These and other features, aspects and advantages of the present invention will become understood with reference to the following description, appended claims and accompanying figures.

DETAILED DESCRIPTION OF THE INVENTION

Figure 1:
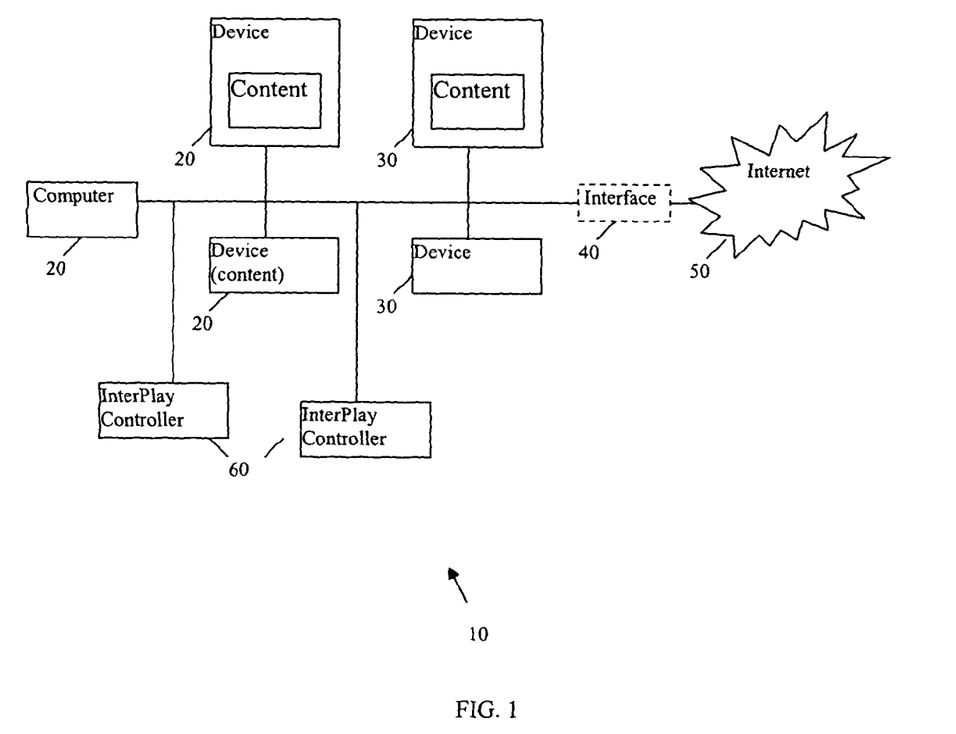
FIG. 1 shows an example of a network implementing an embodiment of the present invention.

FIG. 1 shows an example functional architecture of a network 10, such as a home network, that implements contextual task recommendation and a technique for determining user's context and suggesting tasks, according to an embodiment of the present invention. The network 10 comprises devices 20 (e.g., including content) and devices 30 (e.g., client device having a visual interface to display the client GUI to the user), and optional interface 40 that connects the network 10 to another network 50 (e.g., another home network, the Internet, etc.). Though the devices 20 and 30 are shown separate, a single physical device can include one or more client devices and/or one or more server devices.

The devices 20 and 30, respectively, can implement the HTTP protocol for communication and protocol there between. Though in the example described herein the HTTP protocol is utilized by the network 10, those skilled in the art will recognize that the present invention is useful with other network communication protocols that utilize the client-server model. An example device 20 can be a VCR, DVD, computer, etc. Further, an example client device 30 can be a TV, computer, etc.

The network 10 further includes at least one InterPlay Controller (IC) 60 that in one aspect ascertains the user's context to suggest the most preferred task for the user to perform. A task comprises pseudo-sentence based representation of activities that can be performed using devices". For example, if one has a TV and a DVD player then "Play Movie on TV" is a task. The user's context includes e.g. his/her location, the content he/she is interested in and the devices which are being used by him/her. Using this context, the system suggests tasks to the user that are appropriate to that context.

The determination of context and the suggestion of tasks are performed by keeping track of the content and the devices available to the user at any given time. The suggestion of tasks is performed in accordance with certain policies. Further, the user can control the behavior of the system by changing the rules in the policy. If, based on certain context, more than one task is possible, the system suggests the task that is most relevant to the user. The system builds the context by correlating time, device information, content information, location information and actions performed by the user. This contextual information is then used to find and suggest tasks to the user resulting in task suggestions that are relevant to the user. Prior art only performs simple scoring based on device/task attributes and does not suggest tasks or based on user's context.

As described in more detail further below, in one example, the InterPlay Controller 60 suggests tasks to a user by:
(1) Determining context information such as user's location, the device he/she is using, the content that the user wants to use and the content and the devices that the user is allowed to use,
(2) Optionally, providing policy rules for controlling the behavior of the system, and
(3) Utilizing the user's contextual information to suggest a task that matches the current context.

In one embodiment of the InterPlay Controller 60, the location of the user is determined indirectly using the location of the device in the network that he/she is using. In general, the user uses a client program (e.g., on a client device 20 or a server device 30) to interact with the InterPlay Controller 60. Using a context finder (context agent) 62, the InterPlay Controller 60 acquires the location of each device (e.g., device 20 or 30) from the device or from a configuration file for devices that cannot provide their location.

The devices/configuration files for the device that runs the user's client program also contain an additional piece of information called a "cookie". When the user starts the client program, the client program transmits this cookie to the InterPlay Controller 60. The InterPlay Controller 60 matches the cookie provided by the client program with a cookie in the device configuration files. The location of the device whose cookie matches the client cookie is identified as the location of the user. Finally, content meta-data contains the location of the content. The location for the content is determined from the location of the device that generates or stores the content. The location information can also be obtained from sensors such as GPS on the device. Though some consumer electronics (CE) in a home network may not be equipped with location sensors, use of such location sensors are contemplated by the present invention.

Content meta-data comprises information about the content. For example, a music file contains the track name, the artist, the album, the track number, MIME-type, etc. In the present invention, additional meta-data is utilized. For example, the location information is added to the content meta-data. This piece of data allows correlating location of the content with the location of the user.

Figure 2:
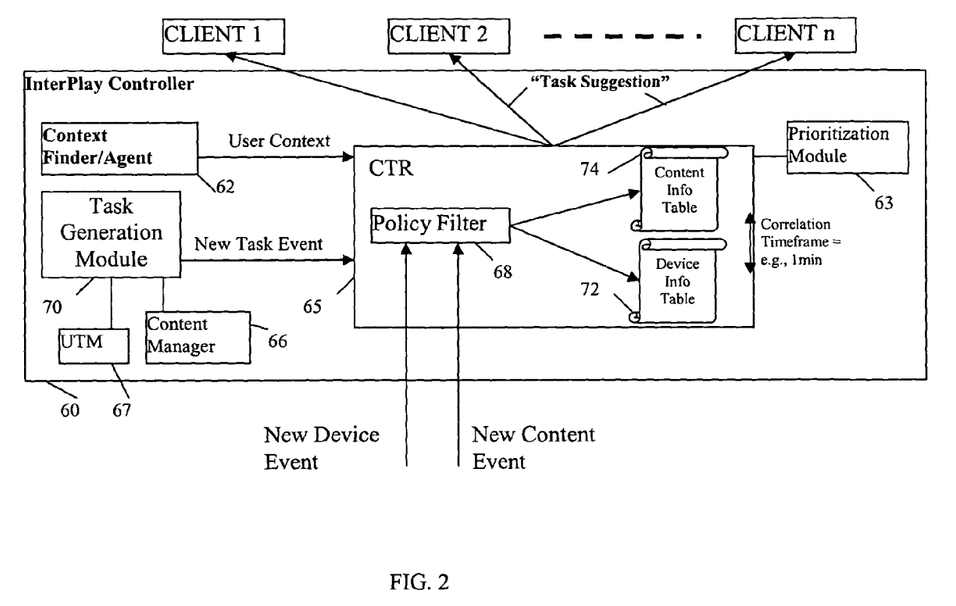
FIG. 2 shows a functional block diagram of InterPlay Controller and Task Generation module according to an embodiment of the present.

FIG. 2 shows a function block diagram of the InterPlay Controller 60 which provides task suggestions to client programs (e.g., CLIENT 1, CLIENT 2 . . . CLIENT N) in a network. The InterPlay Controller 60 includes a Contextual Task Recommender (CTR) 65 and a Task Generation module 70. The Contextual Task Recommender 65 is triggered via a New Device Event or a New Content Event whenever a new device or new content, respectively, is discovered in the network. Typical user activities that can trigger the Contextual Task Recommender include e.g. turning a TV 'ON', inserting an Audio CD into a device, etc. A Prioritization Module 63 provides the CTR 65 priority assigned to a task.

The Policy Filter 68 allows the system to react to only certain kinds of device and content. For example, whenever new content is added to the system, the CTR 65 receives an event. The policy lets the user specify that he is only interested in certain types of files such as, mp3 files. By stating this in the policy file, the Policy Filter 68 ignores all content other than mp3s. When the Policy Filter 68 receives mp3 files, the Policy Filter 68 starts the cycle of determining a relevant task and suggesting it to the user.

Figure 3A:
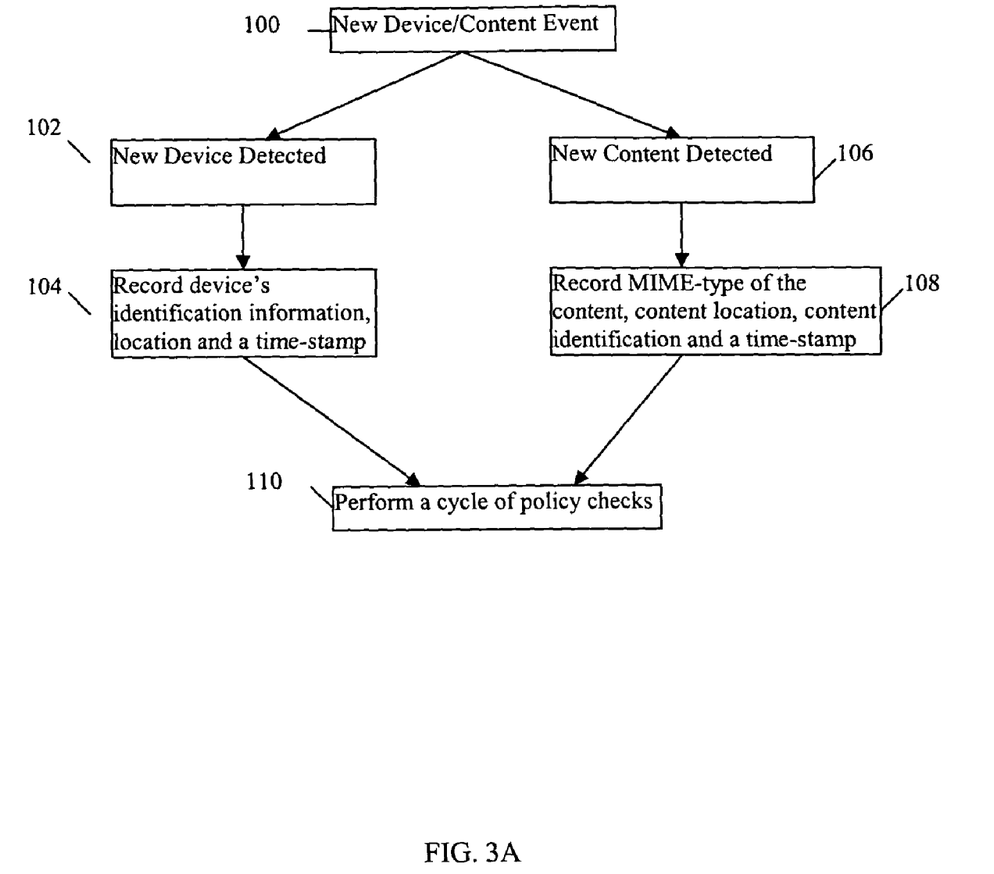
FIG. 3A shows a flowchart of general steps performed by the Contextual Task Recommender according to an embodiment of the present invention.

FIG. 3A shows a flowchart of general steps performed by the example Contextual Task Recommender 65. The Contextual Task Recommender 65 is triggered when a New Device Event or a New Content Event occurs (step 100). If a new device is discovered (step 102), the Contextual Task Recommender 65 records the device's identification information (e.g., name), location and a time-stamp to indicate the time the device became available (step 104). Otherwise, if new content is discovered (step 106), then the Contextual Task Recommender 65 records MIME-type of the content (i.e., a form of meta-data that describes the file format of the file), content location, content identification (content-id) and the time-stamp (step 108). Device and content information are stored in two separate tables 72 and 74, respectively (FIG. 2).

In either event (i.e., new device or new content), before an appropriate "task suggestion" is provided to the user, the Contextual Task Recommender 65 performs a cycle of policy checks where the device name and the content information are inspected for various parameters (e.g., policy rules) (step 110). In one example, a policy rule corresponds to checking a specific piece of device information or content information or both. For instance, the default rule involves checking to determine if the device location or content location is same as the user's location. A rule can be written that specifies the MIME-types of contents that should be handled by the Contextual Task Recommender 65.

The Contextual Task Recommender 65 attempts to find a task when at least one of the following example trigger conditions is satisfied: (1) New device becomes available, (2) New content becomes available. Conditions 1 and 2 may lead to a new task becoming available. Condition 1 always leads to the availability of a new task. Condition 2 may result in the addition of new task if a content corresponding to a new MIME-type is added AND there is at least one device that can render that content.

Figure 3B:
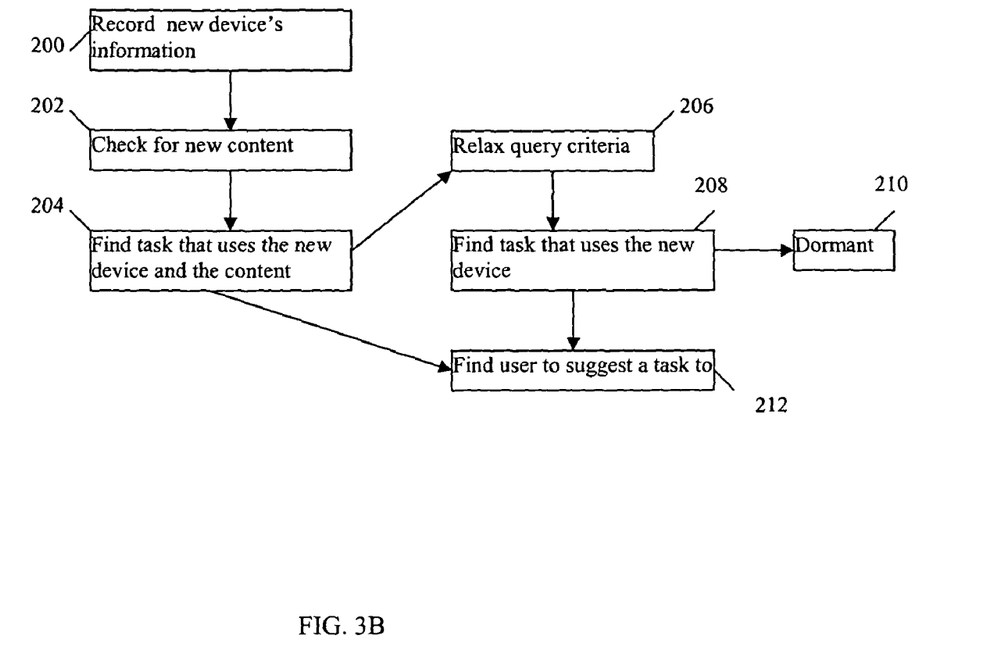
FIGS. 3B-D show flowcharts of example specific steps performed by the Contextual Task Recommender according to an embodiment of the present invention.

Referring to the example flowchart in FIG. 3B, in the first case where a new device becomes available, after the device information (e.g., device name, location and time-stamp) is stored (step 200), in step 202 the Contextual Task Recommender 65 first checks if any new content has been detected recently (e.g., in the past one minute). If the Contextual Task Recommender 65 finds content that matches this criterion, then the Contextual Task Recommender 65 attempts to find a task that uses the newly discovered device and the MIME-type of the content therein (step 204).

If no matching task is found, then the Contextual Task Recommender 65 relaxes the query criteria (step 206) and attempts to find a task that uses the newly discovered device (step 208). If a matching task is not found, the Contextual Task Recommender 65 becomes dormant and waits for a trigger condition (step 210). However, if a matching task is found in either steps 204 or 208, then the Contextual Task Recommender 65 proceeds to the next step and attempts to find the appropriate user (client program) to suggest the task (step 212). In step 202 above, if new content is not found, then the process proceeds to step 206.

Figure 3C:
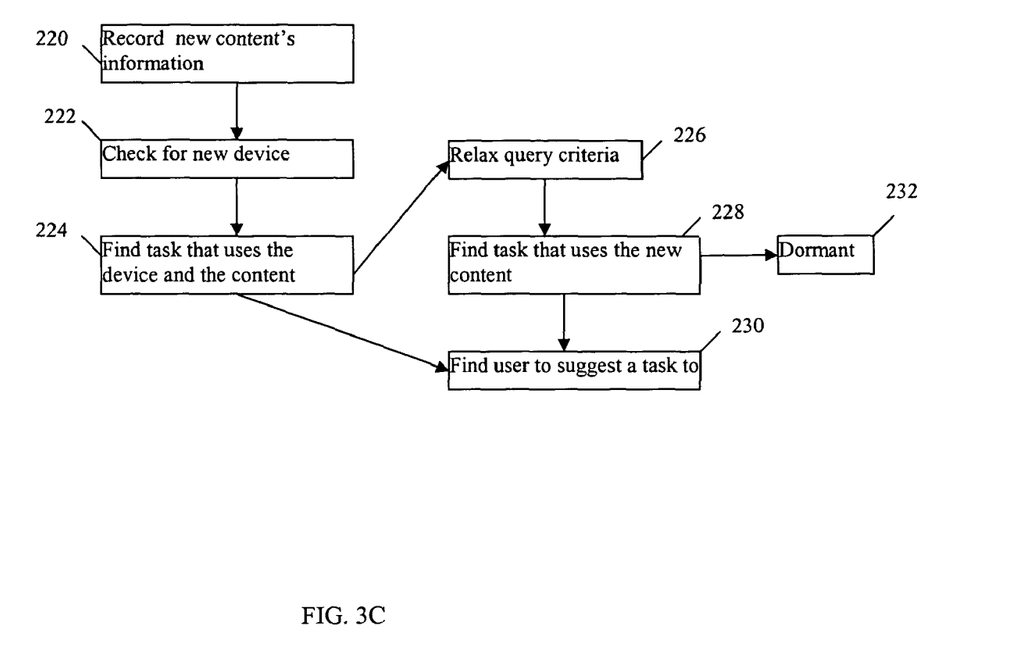

Referring now to the example flowchart in FIG. 3C, in the second case wherein new content becomes available, similar to the first case above, after storing the content information (MIME-type, location, content-id and time-stamp) (step 220), in step 222 the Contextual Task Recommender 65 checks to see if any new device has been discovered in the recent past (e.g., past one minute). If such a device is found, then the Contextual Task Recommender 65 queries the list of available tasks to find a task that matches the device and the MIME-type (step 224).

If these queries fail then the search criteria is relaxed (step 226) and the Contextual Task Recommender 65 queries the list of available tasks using just the MIME-type (228). In either step 224 or 228, if a match is found then the Contextual Task Recommender (CTR) attempts to find an appropriate user (client program) to suggest the task (in other words CTR identifies all the active users to whom the task is relevant to and suggests it to them) (step 230). If a match is not found, then the Contextual Task Recommender 65 becomes dormant and waits for the next trigger condition (event) (step 232). In step 222 above, if new device is not found, the process proceeds to step 226.

The Task Generation module 70 (FIG. 2) generates tasks and operates independently of the Contextual Task Recommender 65. Tasks are generated when new device or content is detected. The Contextual Task Recommender 65 and the Task Generation module 70 both monitor new device and new content availability events.

If the Contextual Task Recommender 65 receives the event (i.e., a new device or new content event) before the Task Generation module 70, the Contextual Task Recommender 65 queries the task before it is generated (this is handled by the third case below wherein the Contextual Task Recommender 65 is triggered by new task available event).

The CTR 65 directly receives only new content/device event and indirectly processes a new task event. A task is generated when the Task Generation module 70 receives new device/new content event. The lifecycle of the CTR 65 is triggered by these events. A situation is possible where the CTR 65 may receive these events and query the Task Generation module 70 before the Task Generation module 70 has finished generating the tasks from these very same events. In this case, queries made by the CTR 65 will fail. This situation is handled by a third trigger condition where the CTR 65 tries to find tasks for recommendation when new tasks become available.

In the third case where a new task becomes available, where the Contextual Task Recommender 65 queries the list of available tasks just before the task is generated, routines that correspond to the first and second cases above are executed based on whatever event caused the generation of the new task (i.e., new device available or new content available).

Figure 3D:
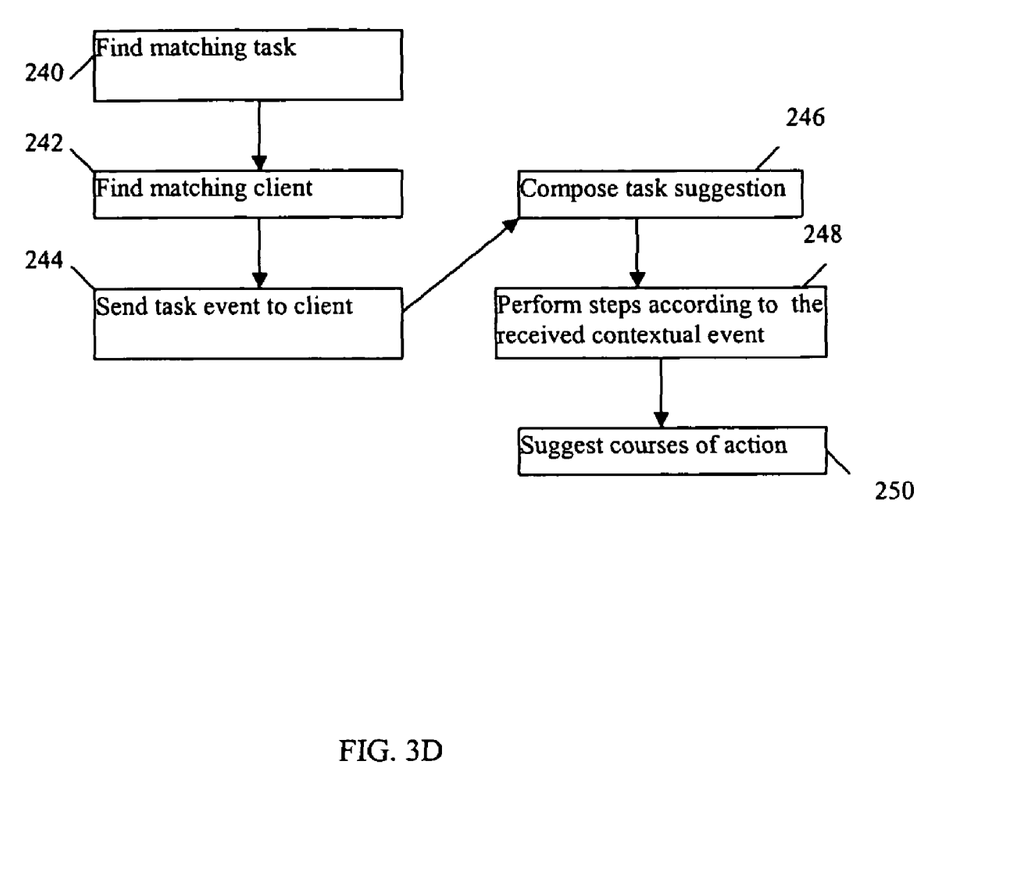

Referring now to the example flowchart in FIG. 3D, once a matching task is found (step 240), the Contextual Task Recommender 65 attempts to find users (client programs) that have the same locations as the devices that makeup the matching task, or the location of the device or both (step 242). If such a client program is found, then the task is packaged in an event and sent to the client program (step 244). The event can also contain content-id, wherein content-id is a unique value assigned to each content item in the system.

In one embodiment, the client program, upon receiving the event, composes a pseudo-sentence from the various parts that make-up the task (step 246) (e.g., "Play Movie on TV"; an example of using content information in composing the sentence would be: "Play Lord of the Rings on the TV"). If content-id is part of the event, the client program retrieves content related information and includes it in the sentence. The sentence is in natural language and can be easily understood by the user. This sentence is displayed to the user using e.g. a pop-up window that stays on the screen for a few seconds. The user can execute that task by selecting an "OK" button in the pop-up window.

The Contextual Task Recommender 65 also inspects the user's current state and suggests possible courses of action to the client program (step 250). For example, if the user is in the process of composing a task, the Contextual Task Recommender 65 includes this information in the event that it sends out and the client program utilizes this information to delay the display of the task to the user till he/she finishes his/her current activity. When the Contextual Task Recommender 65 finds more than one matching task, it recommends the highest ranked task to the user that is most relevant to the user.

Alternatively, upon receiving the contextual event, the client program can take a variety of actions such as, updating the priority of the suggested task among the list of all tasks known to the user, execute the task directly, etc. (step 248).

Figure 4:
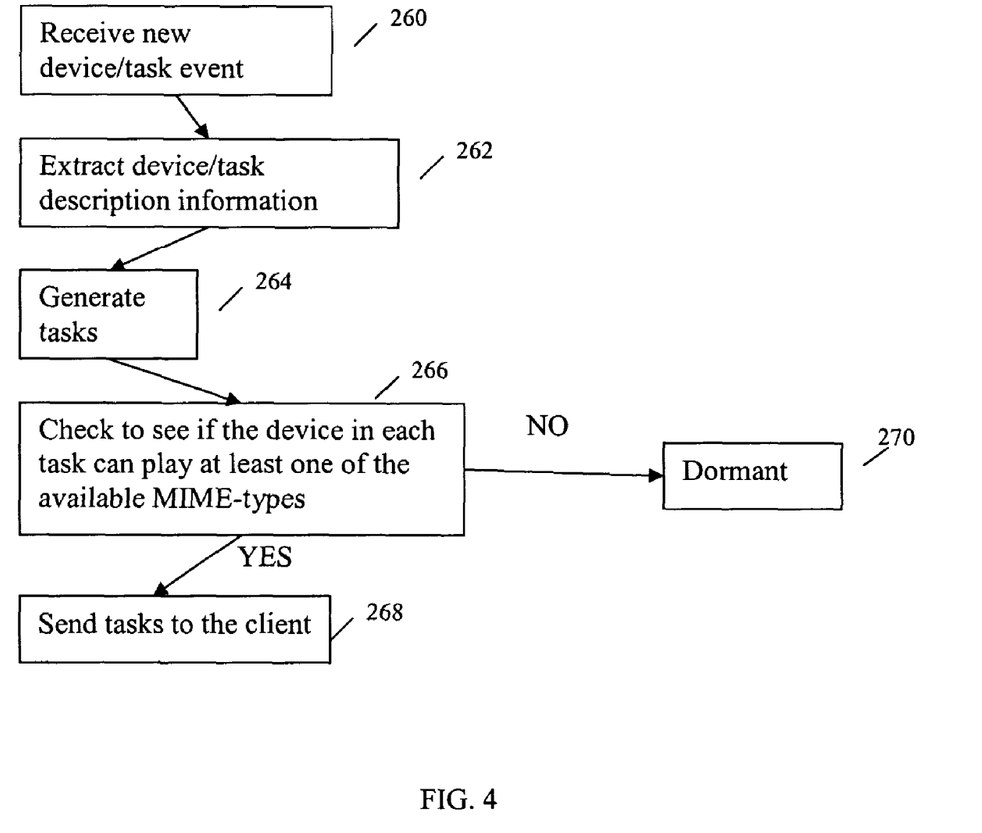
FIG. 4 shows a flowchart the general steps implemented by the Task Generation module according to an embodiment of the present invention.

FIG. 4 shows an example flowchart of the steps performed by the Task Generation module 70. In one example, the Task Generation module 70 is implemented as HomeTaskModel (HTM). The flowchart involved in the generation of a task is as described below.

When a device comes online, it presents its device description and task description to Context Agent (CA) module 62. The CA 62 packages a pointer to the device description and task description into an event. The CA 62 also encloses the name and location of the device in the event, and sends these events to the HTM 70 which are received by the HTM 70 (step 260). Device description comprises device properties (e.g., name to be displayed to the user), device functionalities (e.g., if the device can render audio/video), device attributes (e.g., the screen size of the device) and device grounding information (how to invoke each functionality). Task description comprises information that informs the HTM 70 about the functionalities required to achieve a particular task. For example, a task description specifies that "Play Movie" requires a device with audio rendering capabilities and video rendering capabilities. When the HTM 70 receives these events, it extracts information from the task description and attempts to find devices that offer the functionality required by the task (step 262). The HTM 70 then creates a task for each unique combination of device (step 264). A task comprises subject, verb and information of the device that realizes the task. Device description also contains the list of MIME-types the device can handle. The HTM 70 receives the list of available MIME-types from a Content Manager (CM) module 66 (FIG. 2). The HTM 70 checks to see if the MIME-types supported by the device(s) in the task are available in the system (step 266). If there is at least one MIME-type supported by the device and is available in the system, then the task is sent to the client (step 268), otherwise the system waits for next event (step 270). The system learns about the available mime-types from the Content Manager (CM). In one example, the list of available MIME-types in the system is built using MimeTypeUpdate events received from Content Manager(CM). The HTM 70 sends these new task events to a User Task Manager (UTM) 67 (FIG. 2) which packages it and sends it to the client. When content or devices become unavailable, tasks become unavailable. The HTM 70 keeps track of tasks that are no longer achievable and are packaged as events and sent to the client as unavailable tasks.

Accordingly, the present invention provides a system and method in a network of devices, which ascertains the user's context to suggest the most preferred task for the user to perform. User's context includes his/her location, the content he/she is interested in, the devices which are being used by him/her and optionally the content and devices that the user is allowed to use. Using this context, the system suggests tasks to the user that are appropriate to that context. The determination of context and the suggestion of tasks are performed by keeping track of the content and the devices available to the user at any given time.

The suggestion of tasks is performed in accordance with certain policies. For example, the user can control the behavior of the system by changing the rules in the policy. Tasks are in the form of simple sentences that can be easily understood by the user. If, based on certain context, more than one task is possible, the system suggests the task most relevant to the user.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of suggesting user tasks to be performed by one or more of a plurality of electronic devices in a network, the method comprising:
    determining whether one or more triggering events have occurred upon discovery of new content, new devices and new tasks in the network;
    for each triggering event:
        determining contextual information in the network for a user by:
        keeping track of information about a content and devices available to the user at any given time, and by correlating time, device information, content information, location information, user information, user interests, and actions performed by the user utilizing the devices available to the user to determine contextual information in the network;
        generating a task capable of being performed for each unique combination of the devices based on capability of the devices, available content and behavior of devices in the network;
        suggesting a task relevant to the user by selecting among said tasks based on user interests, each task comprising a pseudo-sentence based representation of the activities that can be performed by the devices, each task suggestion including a subject, verb and information of the devices that realize the task;
        if more than one task is possible then suggesting tasks to the user based on task rank, wherein task rank is based on contextual relevance to the user; and
        if no matching task is found, then relaxing a query criteria and attempt to select a new task.

2. The method of claim 1, wherein upon discovery of a new content triggering event:
    storing a time of the occurrence of the content triggering event; and upon discovery of detecting a new device triggering event:
    storing a time of the occurrence of the device event; and determining whether one or more triggering events have occurred based on the time of the occurrence of the content triggering event and the time of the occurrence of the device triggering event.

3. The method of claim 2 wherein each task suggestion comprises a simple sentence that can be easily understood by the user.

4. The method of claim 2 wherein suggesting tasks further includes:
    if, based on certain context, more than one task is possible, suggesting the task with the highest priority to the user.

5. The method of claim 4 wherein: generating a task further includes using the contextual information to generate/find tasks; suggesting a task further includes using the contextual information to suggest tasks to the user that are relevant to the user.

6. The method of claim 2, wherein a generated task describes devices to play and display content in combination.

7. The method of claim 2, wherein a generated task describes using a plurality of devices to access content and a task is suggested in accordance with user specified policies.

8. The method of claim 1 wherein suggesting a task further includes suggesting one or more tasks in accordance with certain policies.

9. The method of claim 8 wherein a policy comprises rules that effect the behavior of one or more of the devices in the network.

10. The method of claim 9, wherein the policy rules are based on selected devices, type of content and selected location.

11. A system-comprising:
    a controller device configured for suggesting user tasks to be performed by one or more of a plurality of electronic devices in a network, the controller device being coupled to the network along with said plurality of electronic devices, wherein the controller device comprises:
        a context finder module configured for determining contextual information in the network for a user by correlating user context and device context; and
        a contextual task recommender module configured for suggesting one or more tasks to the user based on the contextual information and device capability of the one or more of the plurality of electronic devices upon determining whether one or more triggering events have occurred upon discovery of new content, new devices and new tasks in the network
    the controller being further configured to:
        keep track of information about content and devices available to the user at any given time and build user contextual information by correlating two or more of: time, device information, content information, location information, user information, user interests and actions performed by the user utilizing the devices available to the user;
        generate a task capable of being performed for each unique combination of the devices based on capability of the devices, available content and behavior of devices in the network; and suggest a task relevant to the user by selecting among said tasks based on user interests, each task comprising a pseudo-sentence based representation of the activities that can be performed by the devices, each task suggestion including a subject, verb and information of the devices that realize the task;

if more than one task is possible then suggesting tasks to the user based on task rank, wherein task rank is based on contextual relevance to the user; and if no matching task is found, then relaxing a query criteria and attempt to select a new task.

12. The system of claim 11, wherein the contextual task recommender module is further configured to:

upon discovery of a new content triggering event:

store a time of the occurrence of the content triggering event;

upon discovery of a new device new triggering event;

store a time of the occurrence of the device event; and determine whether one or more triggering events have occurred based on the time of the occurrence of the content triggering event and the time of the occurrence of the device triggering event.

13. The system of claim 12 further including means for keeping track of information about the content and the devices available to the user, such that the contextual task recommender user uses said information to suggest tasks.

14. The system of claim 12 wherein the contextual task recommender module is further configured to suggest one or more tasks in accordance with certain policies.

15. The system of claim 14 wherein a policy comprises rules that effect the behavior of one or more of the devices in the network.

16. The system of claim 12 wherein each task comprises a simple sentence that can be easily understood by the user.

17. The system of claim 12 wherein if, based on certain context, more than one task is possible, the contextual task recommender module is further configured to suggest the task with the highest priority to the user.

18. The system of claim 17 further comprising a task generator that uses the contextual information to find tasks, wherein the contextual task recommender uses the contextual information to suggest tasks to the user that are relevant to the user.

* * * * *